United States Patent
Choi et al.

(10) Patent No.: US 9,831,486 B2
(45) Date of Patent: Nov. 28, 2017

(54) BATTERY MODULE

(71) Applicant: SAMSUNG SDI CO., LTD., Yongin-si, Gyeonggi-do (KR)

(72) Inventors: Hong Keun Choi, Yongin-si (KR); Min Cheol Bae, Yongin-si (KR); Ik Jae Jeong, Yongin-si (KR); Kyoung Hwan Noh, Yongin-si (KR); Ji Ho Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 90 days.

(21) Appl. No.: 15/058,409

(22) Filed: Mar. 2, 2016

(65) Prior Publication Data

US 2016/0315307 A1 Oct. 27, 2016

(30) Foreign Application Priority Data

Apr. 27, 2015 (KR) ........................ 10-2015-0058976

(51) Int. Cl.
*H01M 10/052* (2010.01)
*H01M 2/30* (2006.01)
*H01M 2/10* (2006.01)

(52) U.S. Cl.
CPC ......... *H01M 2/305* (2013.01); *H01M 2/1077* (2013.01); *H01M 2220/20* (2013.01)

(58) Field of Classification Search
CPC ........................ H01M 10/0525; H01M 10/052
See application file for complete search history.

(56) References Cited

U.S. PATENT DOCUMENTS

2012/0121966 A1* 5/2012 Kim .................. H01M 10/0436
429/158

FOREIGN PATENT DOCUMENTS

| KR | 20-1999-0024970 U | 7/1999 |
|---|---|---|
| KR | 10-2008-0035071 A | 4/2008 |
| KR | 10-2013-0043537 A | 4/2013 |

* cited by examiner

*Primary Examiner* — Olatunji Godo
(74) *Attorney, Agent, or Firm* — Lee & Morse, P.C.

(57) ABSTRACT

A battery module includes a plurality of battery cells arranged in one direction and electrically connected to one another, the plurality of battery cells each having a current collecting terminal on a top surface thereof, and a terminal plate positioned on the current collecting terminal of one of the battery cells. The terminal plate is in a form of a sideways-oriented U-shape, including a first surface that contacts the current collecting terminal, a second surface that is parallel to the first surface and spaced apart from the first surface by a predetermined distance, and a third surface connecting the first surface and the second surface, the first surface including a first hole and the second surface including a second hole, the first hole and the second hole having different shapes.

10 Claims, 5 Drawing Sheets

BATTERY MODULE

CROSS-REFERENCE TO RELATED APPLICATION

Korean Patent Application No. 10-2015-0058976, filed on Apr. 27, 2015, in the Korean Intellectual Property Office, and entitled: "Battery Module," is incorporated by reference herein in its entirety.

BACKGROUND

1. Field

Embodiments relate to a battery module.

2. Description of the Related Art

In general, battery cells are used as energy sources for mobile devices, electric vehicles, hybrid vehicles, and the like. The shape of the battery cell may be variously changed depending on the kind of external device to which the battery cell is applied.

A compact mobile device such as a cellular phone can be operated with the power and capacity of a single battery cell for a predetermined time. However, in a case where long-time driving and high-power driving are required in an electric vehicle or hybrid vehicle which consumes a large amount of power, a large-capacity battery module is configured by electrically connecting a plurality of battery cells in order to increase power and capacity. The output voltage or output current of the battery module may be increased according to the number of battery cells built in the battery module. In addition, a battery pack may be configured by electrically connecting such battery modules.

Each battery cell may include a case having an opening, an electrode assembly including a positive electrode plate, a negative electrode plate, and a separator interposed therebetween, and an electrolyte. The electrode assembly and the electrolyte may be accommodated together in the case, and the opening of the case may then be covered with a cap plate. Positive and negative electrode terminals of the electrode assembly may be exposed or protruded to the outside through the cap plate.

SUMMARY

Embodiments are directed to a battery module including a plurality of battery cells arranged in one direction and electrically connected to one another, the plurality of battery cells each having a current collecting terminal on a top surface thereof, and a terminal plate positioned on the current collecting terminal of one of the battery cells. The terminal plate is in a form of a sideways-oriented U-shape, including a first surface that contacts the current collecting terminal, a second surface that is parallel to the first surface and spaced apart from the first surface by a predetermined distance, and a third surface connecting the first surface and the second surface, the first surface including a first hole and the second surface including a second hole, the first hole and the second hole having different shapes.

The current collecting terminal of the one of the battery cells may be a rivet terminal having a flat top surface.

An area of the first surface of the terminal plate may be greater than the area of the second surface of the terminal plate.

A region of the first surface of the terminal plate that is not in an overlapping relationship with the second surface of the terminal plate may include a welding portion.

The first hole in the first surface of the terminal plate may have a polygonal shape. The second hole in the second surface of the terminal plate may have a circular shape.

The first hole may have a hexagonal shape.

The terminal plate may be made of a material having elasticity.

The battery module may further include a bolt mounted in the terminal plate. A head portion of the bolt may be mounted in the first hole. A screw thread portion of the bolt may penetrate through the second hole.

The battery module may further include a nut is mounted in the terminal plate. A lower portion of the nut may be inserted into the first hole.

The battery module may further include a groove portion beneath the second surface of the terminal plate, the groove portion guiding an upper portion of the nut.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
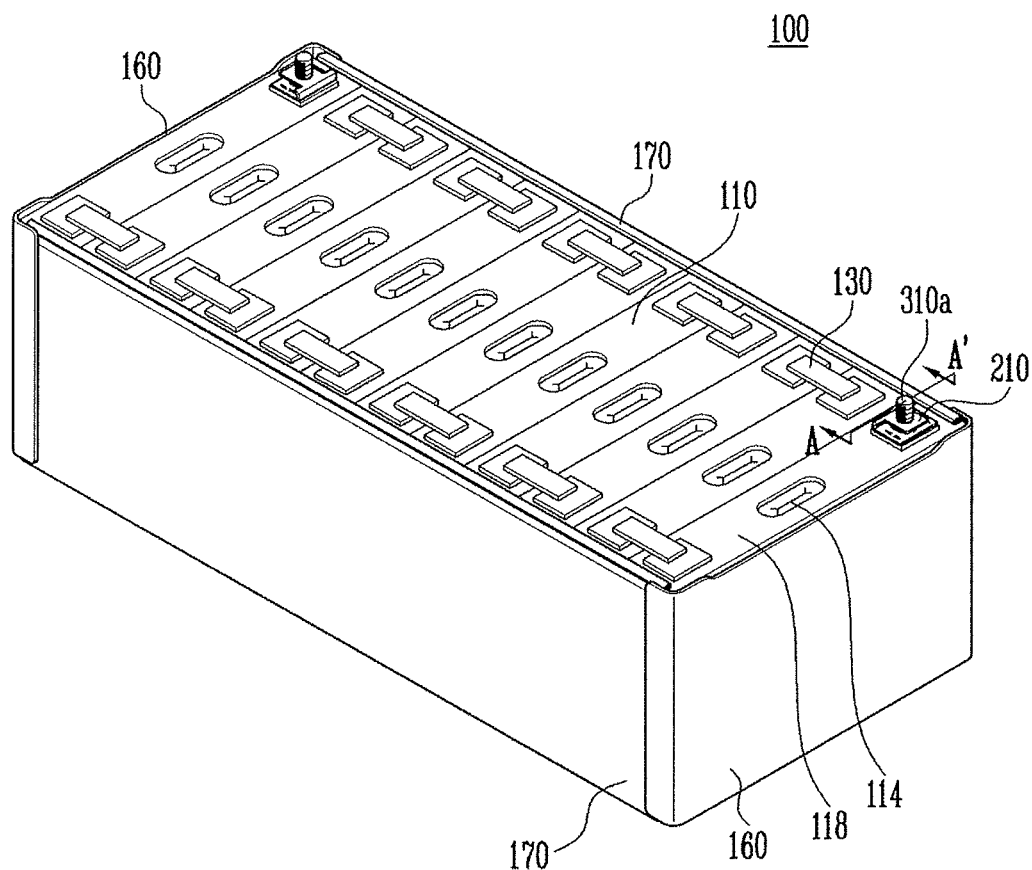
FIG. 1A illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Like reference numerals refer to like elements throughout.

Figure 1B:
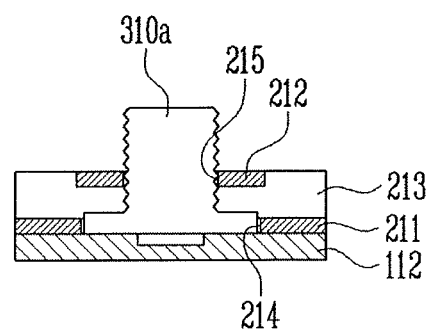
FIG. 1B illustrates a sectional view taken along line A-A' of FIG. 1A.

FIG. 1A illustrates a perspective view of a battery module according to an embodiment. FIG. 1B illustrates a sectional view taken along line A-A' of FIG. 1A.

Referring to FIGS. 1A and 1B, the battery module 100 according to the embodiment may include a plurality of battery cells 110 arranged in one direction and electrically connected to one another. The battery cells 110 may be arranged such that wide surfaces of adjacent battery cells 110 face each other.

Each battery cell 110 constituting the battery module 100 may include a battery case of which one surface is opened, and an electrode assembly and an electrolyte, accommodated in the battery case. The electrode assembly and the electrolyte may generate energy through an electrochemical reaction therebetween. The battery case may be hermetically sealed by a cover 118. For example, the cover 118 of the battery cell 110 may include a cap assembly. The cover 118 may be provided with a first current collecting terminal 112 and a second current collecting terminal, which have different polarities, and a vent portion 114. The vent portion 114 may serve as a safety device of the battery cell 110, providing a passage through which gas generated inside the battery cell 110 is discharged to the outside.

The first current collecting terminal 112 of a battery cell 110 disposed at one outermost side may have a different polarity from a second current collecting terminal of a battery cell 110 disposed at the other outermost side. The first current collecting terminal 112 and the second current collecting terminal may have the same shape. A terminal plate 210 positioned on the first current collecting terminal 112 will be described below.

In this embodiment, a prismatic lithium ion secondary battery will be described as an example of the battery cell 110. In some implementations, the battery cell 110 may be one of various types of batteries such as a lithium polymer battery, or the like.

The battery module 100 may be provided with a pair of end plates 160 adjacent to the outermost battery cells 110. A pair of side plates 170 connecting between the pair of end plates 160 may be disposed at sides of the battery cells 110. The end plate 160 and the side plate 170 may be coupled to each other through laser welding or ultrasonic welding. The plurality of battery cells 110 may be aligned in one direction in a space defined by the pair of end plates 160 and the pair of side plates 170.

When the plurality of battery cells 110 are aligned in parallel such that wide surfaces of adjacent battery cells 110 face each other, a first current collecting terminal 112 and a second current collecting terminal of two adjacent battery cells 110 may be electrically connected to each other through a bus-bar 130.

The bus-bar 130 may be made of an electrically conductive metal, such as gold, silver, copper, nickel, aluminum, copper alloy or aluminum alloy, to electrically connect between the first current collecting terminal 112 and the second current collecting terminal. The bus-bar 130 may be coupled to the first current collecting terminal 112 and the second current collecting terminal through welding, for example, by laser welding or ultrasonic welding. The shape of the bus-bar 130 may be variously formed according to a shape of the first current collecting terminal 112 and the second current collecting terminal.

The first current collecting terminal 112 of the battery cell 110 disposed at the one outermost side may have a positive polarity, and may be used as a high-current connection terminal. The second current collecting terminal of the battery cell disposed at the other outermost side may have a negative polarity, and may be used as a high-current connecting terminal. When the battery module 100 is formed, high-current connection terminals for external current connection may be provided at both ends of the battery module 100.

Generally, a high-current connection terminal may configured as a bolt. Accordingly, when a battery module having a current collecting terminal of a rivet type is formed, a bolt for high-current connection may be additionally welded to the current collecting terminal. As such, the coupling manner of the high-current connection terminal may be determined according to a shape of the current collecting terminal of the battery cell 110.

Embodiments provide a battery module in which a current collecting terminal of a rivet type may be formed, and a terminal plate may be positioned on the current collecting terminal, such that a high-current connection terminal may be implemented in various manners.

Referring to FIG. 1B, the first current collecting terminal 112 of the battery cell 110 may be of a rivet type, and may have a flat top surface. A groove may be formed in one region of the first current collecting terminal 112. The terminal plate 210 may be positioned on the top of the first current collecting terminal 112. The terminal plate 210 may be formed in a '⊏' shape or, as another way of describing the shape, as a sideways-oriented U-shape. The terminal plate 210 may include including a first surface 211 that contacts the first current collecting terminal 112, a second surface 212 positioned in parallel to the first surface 211 while being spaced apart from the first surface 211 at a predetermined distance, and a third surface 213 connecting between the first and second surfaces 211 and 212. A first hole 214 and a second hole 215, which have different shapes, may be formed in the first surface 211 and the second surface 212, respectively.

The first hole 214 and the second hole 215 may be formed at positions corresponding to each other on a vertical section. The first hole 214 may be larger than the second hole 215. The first hole 214 may be formed in a polygonal shape, such as, for example a hexagonal shape, and the second hole 215 may be formed in a circular shape.

The area of the first surface 211 of the terminal plate 210 may be formed greater than the area of the second surface 212 of the terminal plate 210. A welding portion 216 (see FIG. 2B) may be formed in a region of the first surface 211, that does not correspond to the second surface 212, such that the terminal plate 210 may be fixed on the first current collecting terminal 112 through welding. The terminal plate 210 may be made of a material having elasticity, such as, for example, aluminum or the like.

In the state in which the terminal plate 210 is welded on the first current collecting terminal 112, a bolt-shaped first fastening terminal 310*a* may be mounted in the terminal plate 210. In this case, a head portion of the bolt-shaped first fastening terminal 310*a* may be formed in a hexagonal shape. The head portion of the bolt-shaped first fastening terminal 310*a* may be formed in the same shape and size as the first hole 214, to be inserted and mounted in the first hole 214. In addition, a portion at which screw threads are formed in the first fastening terminal 310*a* may be penetrated and inserted into the second hole 215 to protrude upward from the second surface 212.

Accordingly, the terminal plate 210 is positioned on the first current collecting terminal 112 of the rivet type, so that the high-current connection terminal can be easily formed in a bolt shape.

Figure 2A:
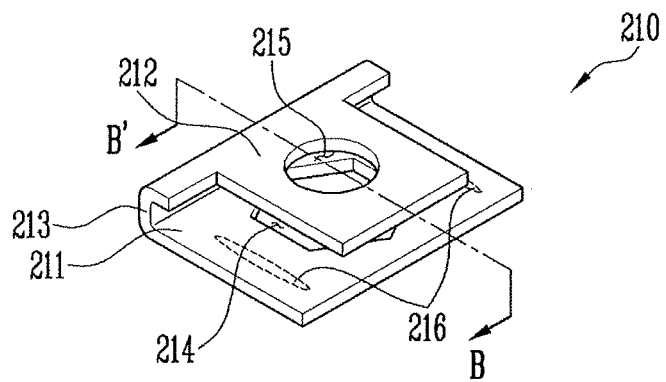
FIG. 2A illustrates a perspective view showing a terminal plate according to an embodiment.
Figure 2B:
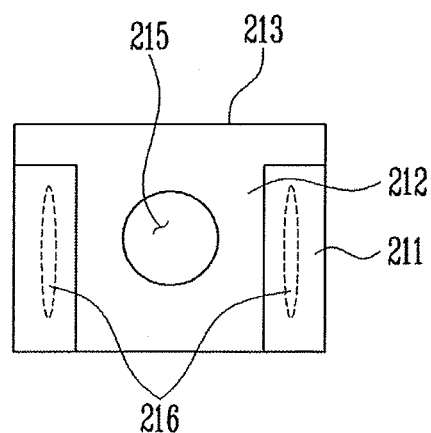
FIG. 2B illustrates a plan view showing the terminal plate according to the embodiment.
Figure 2C:
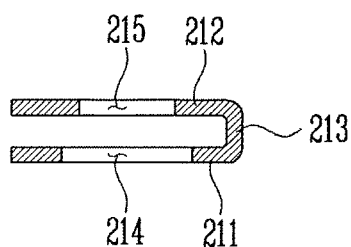
FIG. 2C illustrates a sectional view taken along line B-B' of FIG. 2A.

FIG. 2A is a perspective view showing a terminal plate according to an embodiment. FIG. 2B is a plan view showing the terminal plate according to the embodiment. FIG. 2C is a sectional view taken along line B-B' of FIG. 2A.

Referring to 2A to 2C, the terminal plate 210 may be formed in '⊏' shape, or, as another way of describing the shape, as a sideways-oriented U-shape. The terminal plate 210 may include a first surface 211, a second surface 212, and a third surface 213. For example, the terminal plate 210 may be formed in a '⊏' shape, including a first surface 211 that contacts a current collecting terminal, a second surface 212 positioned in parallel to the first surface 211 and spaced apart from the first surface 211 by a predetermined distance, and a third surface 213 connecting between the first and second surfaces 211 and 212.

As shown in FIG. 2B, the area of the first surface 211 of the terminal plate 210 may be greater than the area of the second surface 212 of the terminal plate 210. A first hole 214 and a second hole 215 may be formed at respective positions of the first surface 211 and the second surface 212 that correspond to each other. The first hole 214, formed in the first surface 211, may be formed in a polygonal shape, for example, in a hexagonal shape, and the second hole 215, formed in the second surface 212, may be formed in a circular shape. Accordingly, a head portion of a bolt or a nut may be easily inserted and fixed into the first hole 214.

When the area of the first surface 211 is formed greater than the second surface 212, a region not corresponding to the second surface 212 may exist in the first surface 211. A welding portion 216 may be formed in one region of the first surface 211 that does not correspond to the second surface 212. The welding portion 216 may be a region in which the terminal plate 210 is fixed to the first current collecting terminal 112 (see FIG. 1B) through welding.

A surface opposite to the third surface 213 may be open, providing a passage through which a fastening terminal, such as a bolt or nut, is inserted into the first and second holes 214 and 215. The terminal plate 210 may be made of a material having elasticity, such as, for example aluminum or the like. The terminal plate 210 may maintain a predetermined strength while having elasticity.

Figure 3A:
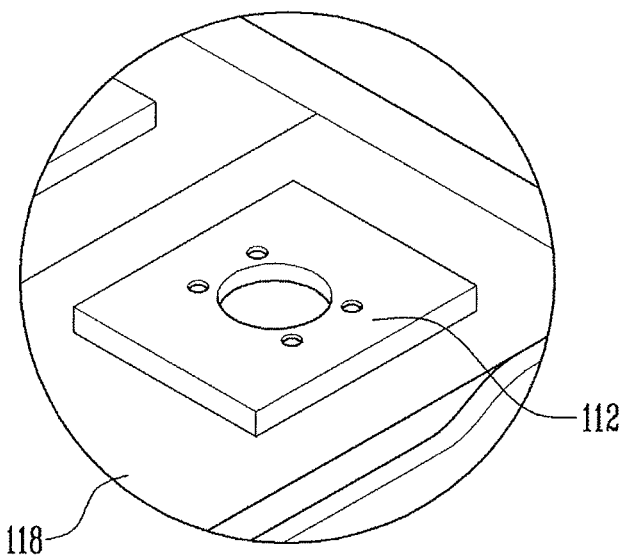
FIG. 3A illustrates a perspective view showing a current collecting terminal according to an embodiment.
Figure 3B:
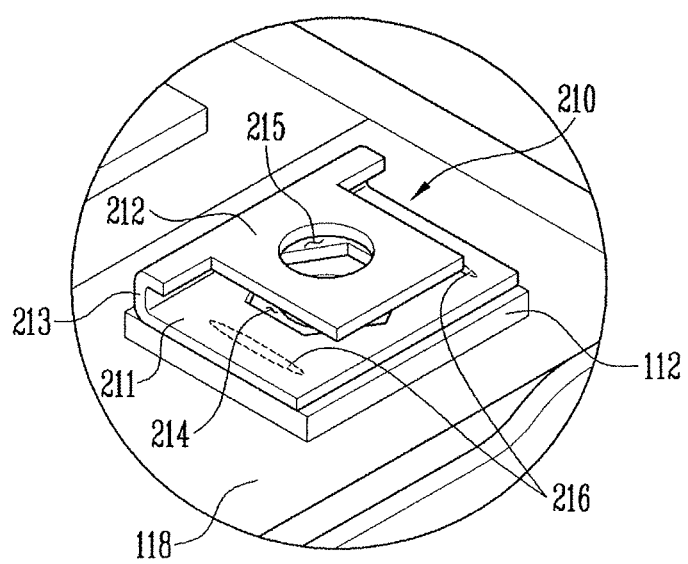
FIG. 3B illustrates a perspective view showing a state in which the terminal plate is welded to the top of the current collecting terminal according to the embodiment.

FIG. 3A illustrates a perspective view showing a current collecting terminal according to an embodiment. FIG. 3B illustrates a perspective view showing a state in which the terminal plate is welded to the top of the current collecting terminal according to the embodiment.

Referring to FIGS. 3A and 3B, the first current collecting terminal 112 may be a rivet type, and the top surface of the first current collecting terminal 112 may be flat. A groove may be formed in a central region of the first current collecting terminal 112. The terminal plate 210 may be welded to the top of the first current collecting terminal 112 such that various high-current connection terminals may be implemented.

As described above, the terminal plate 210 is formed in the '⊏' shape, or, as another way of describing the shape, as a sideways-oriented U-shape. The terminal plate 210 may include the first surface 211, the second surface 212, and the third surface 213. The hexagonal first hole 214 may be formed in the first surface 211, and the circular second hole 215 may be formed in the second surface 212. When the first and second holes 214 and 215 are present, the groove formed in the central region of the first current collecting terminal 112 may be exposed even though the terminal plate 210 is fixed on the first current collecting terminal 112 through welding at the welding portion 216.

The terminal plate 210 may be positioned on the first current collecting terminal 112 having the rivet type, such that a high-current connection terminal may be implemented in various ways, as will described below with respect to FIGS. 4 to 6.

Figure 4:
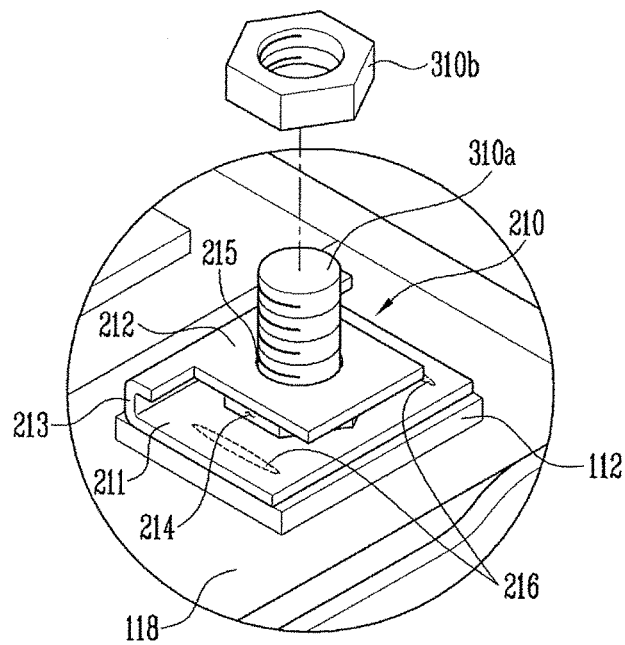
FIG. 4 illustrates a perspective view showing a state in which a bolt is inserted into the terminal plate and fastened to a nut according to an embodiment.

FIG. 4 illustrates a perspective view showing a state in which a bolt is inserted into the terminal plate and fastened to a nut according to an embodiment.

Referring to FIG. 4, the bolt-shaped first fastening terminal 310a may be mounted in the terminal plate 210 fixed on the first current collecting terminal 112 through welding. A head portion of the bolt may be mounted in the first hole 214, and a screw thread portion of the bolt may penetrate through the second hole 215 to protrude upwardly from the second surface 212 of the terminal plate 210.

As such, in the state in which the bolt-shaped first fastening terminal 310a is mounted in the terminal plate 210, a nut-shaped first fastening member 310b may be fastened to the screw thread portion protruding upward from the second surface 212 of the terminal plate 210.

Figure 5A:
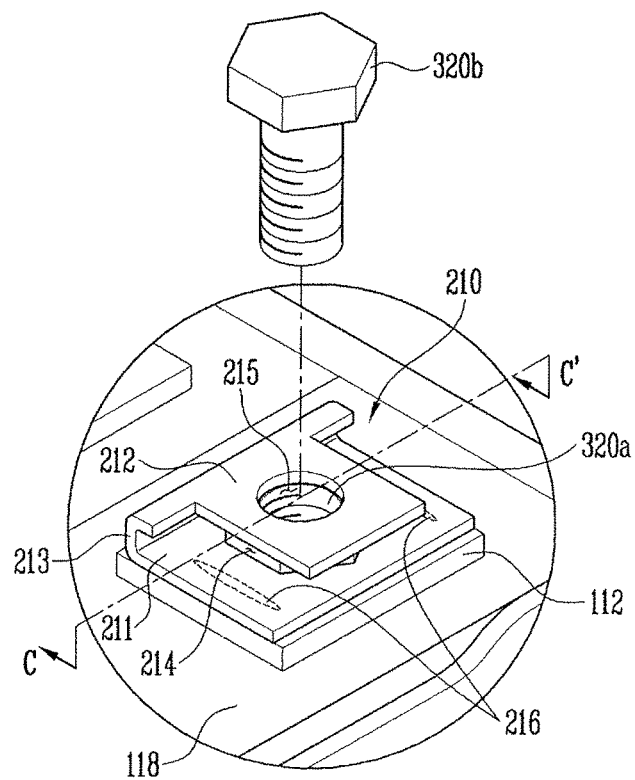
FIG. 5A illustrates a perspective view shown a state in which a nut is inserted into the terminal plate, and a bolt is fastened to the nut according to an embodiment.
Figure 5B:
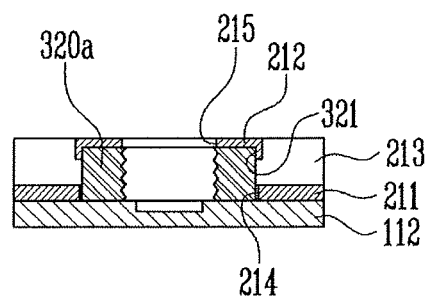
FIG. 5B illustrates a sectional view taken along line C-C' of FIG. 5A.

FIG. 5A illustrates a perspective view showing a state in which a nut is inserted into the terminal plate, and a bolt is fastened to the nut according to an embodiment. FIG. 5B illustrates a sectional view taken along line C-C' of FIG. 5A.

Referring to FIGS. 5A and 5B, a nut-shaped second fastening terminal 320a may be mounted in the terminal plate fixed on the first current collecting terminal 112 through welding. A lower portion of the nut-shaped second fastening terminal 320a may be inserted and mounted into the first hole 214. An underside of the second surface 212 of the terminal plate 210 may include a groove portion 321 that guides an upper portion of the nut-shaped second fastening terminal 320a. Accordingly, the nut-shaped second fastening terminal 320a may be fixed by the first hole 214 and the groove portion 321 in a state in which the nut-shaped second fastening terminal 320a is positioned between the first and second surfaces 211 and 212.

As such, in the state in which the nut-shaped second fastening terminal 320a is mounted in the terminal plate 210, a bolt-shaped second fastening member 320b may be fastened in the second hole 215 of the terminal plate 210.

Figure 6:
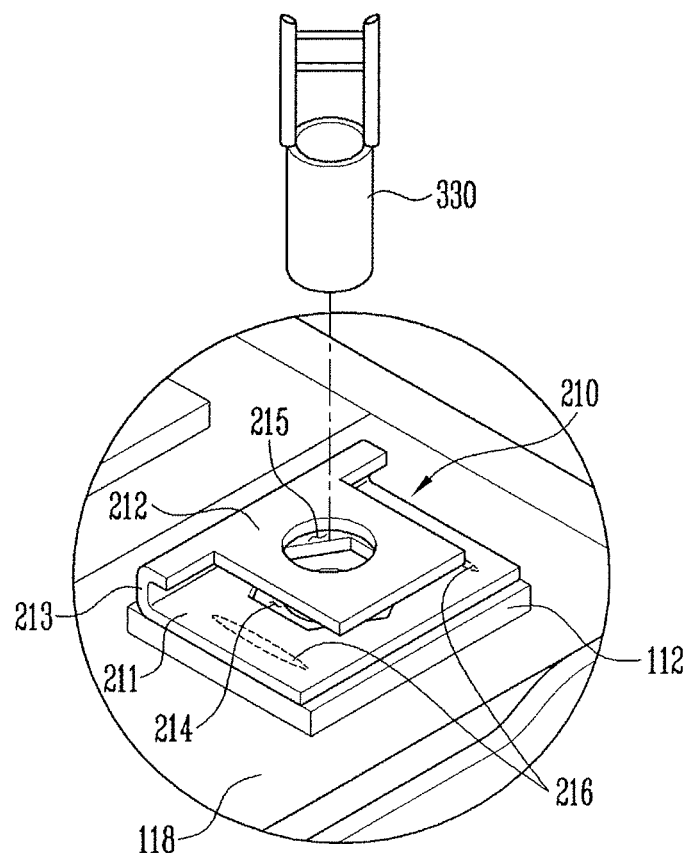
FIG. 6 illustrates a perspective view showing a state in which a fastening terminal is fastened to the terminal plate according to an embodiment.

FIG. 6 illustrates a perspective view showing a state in which a fastening terminal is fastened to the terminal plate according to an embodiment.

Referring to FIG. 6, a terminal member 330 having a circular shape may penetrate through the first and second holes 214 and 215 of the terminal plate 210 fixed on the first current collecting terminal 112 through welding. The terminal member 330 may then be inserted and fixed into the groove formed in the central region of the top surface of the first current collecting terminal 112.

By way of summation and review, current collecting terminals, which have positive and negative polarities and are positioned at ends of a battery module configured by electrically connecting a plurality of battery cells, respectively, may be used as high-current connection terminals for external current connection.

Embodiments provide a battery module in which a '⊏'-shaped (or sideways-oriented U-shaped) terminal plate having holes formed therein is formed on each current collecting terminal used as a high-current connection terminal, such that the high-current connection terminal can be implemented in various manners in the battery module having the current collecting terminals of a rivet type, and such that the battery module may be applied to various systems.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery module, comprising:
    a plurality of battery cells arranged in one direction and electrically connected to one another, the plurality of battery cells each having a current collecting terminal on a top surface thereof; and
    a terminal plate positioned on the current collecting terminal of one of the battery cells,
    wherein the terminal plate is in a form of a sideways-oriented U-shape, including a first surface that contacts the current collecting terminal, a second surface that is parallel to the first surface and spaced apart from the first surface by a predetermined distance, and a third surface connecting the first surface and the second surface, the first surface including a first hole and the second surface including a second hole, the first hole and the second hole having different shapes.

2. The battery module as claimed in claim 1, wherein the current collecting terminal of the one of the battery cells is a rivet terminal having a flat top surface.

3. The battery module as claimed in claim 1, wherein an area of the first surface of the terminal plate is greater than the area of the second surface of the terminal plate.

4. The battery module as claimed in claim 3, wherein a region of the first surface of the terminal plate that is not in an overlapping relationship with the second surface of the terminal plate includes a welding portion.

5. The battery module as claimed in claim 1, wherein the first hole in the first surface of the terminal plate has a polygonal shape, and the second hole in the second surface of the terminal plate has a circular shape.

6. The battery module as claimed in claim 5, wherein the first hole has a hexagonal shape.

7. The battery module as claimed in claim 1, wherein the terminal plate is made of a material having elasticity.

8. The battery module as claimed in claim 1, further including a bolt mounted in the terminal plate,
    wherein a head portion of the bolt is mounted in the first hole, and a screw thread portion of the bolt penetrates through the second hole.

9. The battery module as claimed in claim 1, further including a nut is mounted in the terminal plate,
    wherein a lower portion of the nut is inserted into the first hole.

10. The battery module as claimed in claim 9, further including a groove portion beneath the second surface of the terminal plate, the groove portion guiding an upper portion of the nut.

* * * * *